United States Patent Office 3,225,924
Patented Dec. 28, 1965

3,225,924
PROCESS FOR THE ELECTROSTATIC SEPARATION OF CARNALLITE-CONTAINING CRUDE SALTS
Hans Autenrieth, Hannover-Kirchrode, Gerd Karl Peuschel, Bonnenberg, Hannover, and Günter Weichart, Hannover-Dohren, Germany, assignors to Kali-Forschungs-Anstalt, Gesellschaft mit beschränkter Haftung, Hannover, Germany
No Drawing. Filed Aug. 13, 1962, Ser. No. 216,332
Claims priority, application Germany, Aug. 26, 1961, K 44,586
4 Claims. (Cl. 209—9)

This invention relates to an improved process for the electrostatic separation of carnallite minerals from crude potash ores.

In a great number of potash salt beds, there exist "carnallitic mixed salts," i.e. carnallite ($KCl \cdot MgCl_2 \cdot 6H_2O$) is present together with sylvinite ($KCl+NaCl$) or with hartsalz ($KCl+NaCl+MgSO_4 \cdot H_2O$), and when such a deposit occurs, it is desirable to mine and work up the natural mixture of these salts. A problem arises, however, in working up these "carnallitic mixed salts" inasmuch as it is necessary to provide special methods for decomposing the carnallite at a suitable stage in the manufacturing process in order to separate KCl from $MgCl_2$. It is, therefore, expedient to subject the ore to a preliminary separation step to obtain a carnallite concentrate.

To accomplish this separation, German patents (DBP 1,060,331 and DBP 1,092,401) have described methods for the electrostatic separation of such mixed salts. These methods are based on the fact that a concentrate of carnallite can be obtained from the pulverized crude-salt mixture by taking advantage of the fact that at certain temperatures and moisture contents of the air, the conductivity of the various minerals is such that a selective electrostatic separation of the carnallite may be attained. The sylvite-containing residue freed from the carnallite can thereafter be concentrated according to either conventional solution or flotation methods, or by chemical conditioned electrostatic separation, e.g. according to U.S. application Ser. No. 709,750,, being assigned to the same party as the instant application.

The latter electrostatic method, without any major modification, is also useful for separating carnallite from non-potassium containing minerals. Furthermore, on a laboratory scale, it appeared that a "carnallite mixed salt" could be upgraded to obtain sylvite and carnallite concentrates by first separating the mixed salt into a sylvite fraction and a carnallite plus non-potassium containing mineral fraction, and then concentrating each fraction separately. However, when this process was tested on a pilot plant and industrial scale, it was discovered that the carnallite remains in, and dilute the potassium concentration of the sylvite concentrate to such a degree that the process becomes technically and economically impractical. This is particularly true since carnallite can be resolved into its separate salts by a wet process only, and therefore it must be separated from the sylvite so that it can be treated in a separate operation.

However, it has heretofore been impossible to obtain by chemical conditioned electrostatic separation on other than on a laboratory scale, a sylvite concentrate poor in carnallite, on the one hand, and a carnallite concentrate poor in sylvite, on the other hand.

The principal object of this invention, therefore, is to provide an industrial process for the separation of carnallite mixed salts into concentrates rich in sylvite and poor in carnallite, and concentrates rich in carnallite and poor in sylvite.

Upon further study of the specification and appended claims, other objects and advantages of the invention will become apparent.

To attain the objectives of this invention, it has been discovered that it is possible by the selection of certain chemicals for conditioning of the crude carnallitic mixed salts and subsequent electrostatic separating to obtain a preconcentrate containing carnallite and sylvite on the one hand, and a non-potassium containing fraction on the other hand; and then to separate the preconcentrate containing the greater part of the carnallite into maximum concentrates rich in sylvite and fractions low in sylvite but in carnallite, by effecting a chemical conditioning of the preconcentrates utilizing certain reagents different from those used in the treatment of the crude salt mixture, and then electrostatically separating the preconcentrate hereafter. The concentrates rich in carnallite are then decomposed with the aid of water or suitable salt solutions, thereby obtaining $MgCl_2$-free potassium salts. The $K_2O$ content of these $MgCl_2$-free salts may be adjusted to 40–60% or above, thereby producing compositions which correspond to fertilizer products conventionally utilized in agriculture.

The main portion of the sylvite contained in the preconcentrates (above 88%) is, moreover, advantageously obtained during the electrostatic separation directly as a concentrate having 58–61% of $K_2O$ and low in carnallite, thereby eliminating the need for any subsequent treatment.

The process in detail is operated as follows:

The crude salt ore is ground to a size suitable for electrostatic separation, preferably about 0.7–1.5 mm. To the ground salt is added a first stage chemical conditioning reagent by any conventional method whereby the reagent can be employed as a solid, a true solution, a suspension, or emulsion and the like. The weight ratio of chemical reagent to salt ore is generally about 0.10–0.66 pounds per ton respectively, more or less being dependent on the particular ore and first stage reagent employed.

The first stage reagent is generally selected from a group comprising carboxylic acids having at least 3 carbon atoms, said acid being of any structure such as aliphatic, alicyclic, aryl, or aralkyl; also the salts and esters of such acids which may contain in the molecule additional carboxyl groups, and/or sulfonic groups and/or other functional groups. The reagent may also be any organic substance containing at least 6 carbon atoms to the molecule and in which at least one $SO_4$—Me or $SO_3$—Me group is attached. Still further reagents can comprise mixtures of the aforementioned compounds by themselves or in mixtures with other conditioning agents known to be suitable for the electrostatic separation of sylvite-containing ores.

The preferred first stage reagents which by far give the best results, are listed as follows:
(1) Sodium salt of oxystearinsulfonic acid ("Prastabitol")
(2) Sulfate of oxystearic acid amide
(3) Sodium salt of a sulfonated naphthylester
(4) Oleic acid
(5) Ricinic acid
(6) Oxystearic acid
(7) Glutamic acid (8) Mixture of fatty acids $C_3$–$C_{10}$
(9) Mixture of fatty acids $C_7$–$C_{12}$
(10) Mixture of fatty acids $C_{12}$–$C_{18}$
(11) Linseed oil fatty acids
(12) Naphthenic acids (crude)
(13) Shellac
(14) Alizarine yellow G (Color Index No. 36)
(15) Eosin (Color Index No. 768)
(16) Uranine (Color Index No. 766)
(17) Benzo orange R (Color Index No. 415)
(18) Glycocolldodecylester
(19) Rhodamine 3 B extra (Color Index No. 751)
(20) Olive oil
(21) Margarine
(22) Saccharin-ortho-benzoic sulfimide
(23) Mixtures of fatty acids $C_3$–$C_{10}$+sodium salt of alkylsulfonic acid 1:1
(24) Nonyl sulfate
(25) Sodium salt of alkylsulfonic acid ("Mersolate 30" Bayer)
(26) Sodium salt of alkylsulfonic acid ("Mersolate D" Bayer)
(27) Sodium salt of ricinic acid
(28) Sodium salt of alkylbenzenesulfonic acid
(29) Sodium salt of alkylnaphthalenesulfonic acid
(30) "Lichtgrün SF" (Color Index No. 669)
(31) Sodium salt of benzylnaphthalenesulfonic acid
(32) Sodium salt of naphthylestersulfonic acid ("Dynesol" Amalgamated Chemical Corp.)
(33) Sulfonated amides of fatty acids ("Xynomine" onyx)
(34) Alkylsulfonate ("Witolatpaste" Imhausen)
(35) Sodium salt of alkylsulfonic acid ("Mersolate D")+sodium salt of alkylnaphthalenesulfonic acid 1:1
(36) Sodium salt of oxystearinsulfonic acid ("Prastabitol")+sodium salt of sulfonated ricinic acid 1:1
(37) Sodium salt of oxystearinsulfonic acid ("Prastabitol")+sodium salt of alkylsulfonic acid ("Mersolate D") 1:1
(38) Mixture of fatty acids $C_{14}$–$C_{22}$
(39) Naphthenic acids, distilled
(40) 6-sulfanil-2,4-dimethyl-pyrimidine ("Elkosin")

After the first stage conditioning step, the treated ore is subjected to an electrostatic separation at a temperature generally beween ambient temperature and 167.5° C. (the melting point of carnallite), preferably between 30–80° C. A conventional electrostatic system such as free fall or roll separators can be effectively employed with preferred separating potentials of approximately 3–9 kv./cm. In this way a carnallite preconcentrate is obtained substantially free of nonpotassium containing minerals.

This carnallite-containing preconcentrate is then chemically conditioned with a different reagent, the preferred examples being:

(A) Benzoic acid
(B) Phthalic acid
(C) Salicyclic acid
(D) Cinnamic acid
(E) Atropic acid
(F) Phenyl acetic acid
(G) Alpha-nitroso-beta-naphthol
(H) Beta-nitroso-alpha-naphthol as well as the salts of these compounds, substitution products and derivatives, for example methyl benzoic acid, chlorobenzoic acid, methyl- and ethyl-salicyclic acid, vanillin acid and the like. In any event, moreover, it is essential to the success of this invention that the second stage conditioning reagents be different from the first stage reagents, or otherwise the $K_2O$ yields will be exceptionally low.

The conditioning and electrostatic separation in the second stage is otherwise conducted in the same manner as the first stage, but with an unexpected result. By virtue of the second stage, there are obtained concentrates rich in carnallite and poor in sylvite, on the one hand, and concentrates rich in sylvite and poor in carnallite, on the other hand, and of most importance this process is amenable to industrial scale operation.

Without further analysis, it is believed that one skilled in the art can comprehend and use the present invention. The following examples, therefore, are merely specific preferred embodiments, and are thus not to be construed as limitative of the remainder of the specification and appended claims in any way whatsoever.

From two different mixed carnallitic salts containing 4 and 12% carnallite there are obtained preconcentrates of the following composition by electrostatically separating after conditioning with fatty acids or sulfonated oxystearic acid at a separation temperature of 65° C. and a $K_2O$ yield of 91 or 93%, respectively:

(1) 49.5% of $K_2O$ and 19.5% of carnallite
(2) 42.5% of $K_2O$ and 38.0% of carnallite A further separation of the two preconcentrates into a fraction rich in carnallite but poor in sylvite as well as a fraction rich in sylvite but low in carnallite cannot be achieved by means of the conditioning agents utilized in stage one.

In stage two, the preconcentrates are again conditioned with the conditioning agents listed in Tables 1 and 2, and are once more separated at the temperatures indicated in the tables, the results obtained also being noted in the tables.

TABLE I

Starting material (pre-concentrate) 49.5% $K_2O$ with 19.5% carnallite

| No. | Conditioning Agent | Quantity Applied, lb./t. | Separation Temp., °C. | Fraction Rich In Carnallite | | Fraction Rich In Sylvite | |
|---|---|---|---|---|---|---|---|
| | | | | $K_2O$ Percent | Percent Carnallite | $K_2O$ Percent | Percent Carnallite |
| 1 | Benxoic acid | 0.33 | 60 | 28.97 | 60.1 | 58.3 | 2.1 |
| 2 | Salicylate of sodium | 0.33 | 60 | 20.68 | 69.0 | 59.1 | 3.0 |
| 3 | Sodium-cinnamate | 0.22 | 60 | 13.33 | 78.42 | 60.3 | 1.9 |
| 4 | α-Nitroso-β-naphthol | 0.44 | 75 | 26.7 | 70.5 | 57.1 | 2.5 |
| 5 | Sodium phthalate | 0.33 | 75 | 19.74 | 66.82 | 60.5 | 2.0 |
| 6 | Saccharin | 0.22 | 80 | 23.1 | 68.7 | 58.3 | 3.1 |

TABLE II

*Starting material (pre-concentrate) 42.5% K₂O with 38% carnallite*

| No. | Conditioning Agent | Quantity Applied, lb./t. | Separation Temp., °C. | Fraction Rich In Carnallite | | Fraction Rich In Sylvite | |
|---|---|---|---|---|---|---|---|
| | | | | K₂O Percent | Percent Carnallite | K₂O Percent | Percent Carnallite |
| 7 | Sodium-cinnamate | 0.22 | 75 | 22.78 | 78.97 | 59.3 | 3.1 |
| 8 | Salicylate of sodium | 0.22 | 75 | 20.6 | 88.85 | 57.1 | 4.1 |
| 9 | Mixture 7 and 8 at ratio of 1:1. | 0.33 | 75 | 18.33 | 87.02 | 60.0 | 2.5 |
| 10 | Chlorobenzoic acid | 0.17 | 60 | 19.76 | 87.65 | 58.3 | 3.5 |
| 11 | Sulfobenzoic acid | 0.17 | 60 | 17.9 | 90.5 | 59.1 | 3.0 |
| 12 | Sodium vanillate | 0.17 | 60 | 21.72 | 81.26 | 59.5 | 2.6 |

As can be seen from the numbers indicated in the preceding tables, it is possible to produce by this invention the greater part of the sylvite in the form of a high-percent maximum concentrate low in carnallite and with a sylvite yield of between 88 and 98%, on the one hand, and a product relatively rich in carnallite and low in sylvite, on the other hand, from which commercial potash fertilizer salts having a K₂O content of 50–60% can be produced by decomposition of the carnallite in a conventional manner.

The process of this invention presents a very simple solution to the hitherto particularly difficult problem of the preparation of mixed carnallitic salts and constitutes considerable advantages over the state of the art.

The methods described in German Patents 1,060,331 and 1,092,401 of a preliminary separation of the carnallite without utilizing chemical conditioning agents have the significant disadvantage that the humidity of the air in the room in which the separation is effected must be adjusted very accurately so that the carnallite becomes selectively covered with a brine skin. This adjustment of the humidity as well as the adjustment of the water-vapor balance between air and rock salt to be prepared presents, however, especially in unstable weather conditions, considerable difficulties. Moreover, the specific throughputs of the separators in separations based on the differing conductivity of the mineral components, are small.

In contrast, in the present process, the separation is not effected by conductivity differences between the components, but rather by the mutual acquisition of electrostatic charges that are formed by frictional contact of the mineral particles with one another after chemical conditioning. The operating conditions are thereby far from the dew point of the water vapor of the air and allow for a large tolerance for the humidity of the room air and the separating temperature. The throughput capacity of the separators is thereby considerably higher than in the case of conductivity separation and the results of the separation meet the practical requirements in all ways. The present process, therefore, presents important advantages over the customary wet-chemical methods of preparing mixed carnallitic salts, especially the following:

(1) The K₂O contents of the products are 10–20 higher;
(2) The K₂O yield is 5–15% higher according to the carnallite content and the wet-chemical process applied;
(3) The heat energy required is by one order of magnitude lower than in wet-chemical processes;
(4) The brine separation and drying for the production of the maximum concentrate low in carnallite can be omitted and considerably less apparatus is required for the decomposition of the carnallite concentrate. This means a considerable decrease in the expenses involved for apparatus, energy and repairs.

From the foregoing description, one skilled in the art can easily ascertain the essential characteristics of this invention, and without departing from the spirit and scope thereof, can make various changes and modifications of the invention to adapt it to various usages and conditions. Consequently, such changes and modifications are properly, equitably and intended to be within the full range of equivalence of the following claims.

What is claimed is:

1. A process for the electrostatic separation of crude carnallitic mixed salts comprising:
   (a) grinding crude carnallitic mixed salts;
   (b) admixing with the ground salts of (a) an operable amount of a first chemical conditioning reagent, said first chemical conditioning reagent selected from the group consisting of
   Sodium salt of oxystearinsulfonic acid,
   Sulfate of oxystearic acid amide,
   Sodium salt of a sulfonated naphthylester,
   Saccharine,
   Oleic acid,
   Ricinic acid,
   Oxystearic acid,
   Glutamic acid,
   Mixture of fatty acids $C_3$–$C_{10}$,
   Mixture of fatty acids $C_7$–$C_{12}$,
   Mixture of fatty acids $C_{12}$–$C_{18}$,
   Linseed oil fatty acids,
   Crude naphthenic acids,
   Shellac,
   Alizarine yellow G,
   Eosin,
   Uranine,
   Benzo orange R,
   Glycocolldodecylester,
   Olive oil,
   Margarine,
   Mixture of saccharin and ortho-benzoic sulfimide,
   1:1 mixtures of fatty acids $C_3$–$C_{10}$ and sodium salt of alkylsulfonic acid,
   Nonyl sulfate,
   Sodium salt of alkylsulfonic acid,
   Sodium salt of ricinic acid,
   Sodium salt of alkylbenzenesulfonic acid,
   Sodium salt of alkylnaphthalenesulfonic acid,
   Sodium salt of benzylnaphthalenesulfonic acid,
   Sodium salt of naphthylestersulfonic acid,
   Sulfonated amides of fatty acids,
   Alkylsulfonate,
   1:1 mixture of sodium salt of alkylsulfonic acid, and sodium salt of alkylnaphthalenesulfonic acid,
   1:1 mixture of sodium salt of oxystearinsulfonic acid and sodium salt of sulfonated ricinic acid,
   1:1 mixture of sodium salt of oxystearinsulfonic acid and sodium salt of alkylsulfonic acid,
   Mixture of fatty acids $C_{14}$–$C_{22}$,
   Distilled naphthenic acid, and
   6-sulfanil-2,4-dimethyl-pyrimidine;
   (c) electrostatically separating the conditioned ground salts of (b) into a carnallite preconcentrate fraction substantially free of non-potassium containing salts and a non-potassium containing fraction;
   (d) admixing with said carnallite preconcentrate a second chemical reagent different from said first chemical reagent, said second chemical reagent selected from the group consisting of benzoic acid, salts of benzoic acid, phthalic acid, salts of phthalic acid, salicylic acid, salts of salicylic acid, cinnamic acid, atropic acid, salts of atropic acid, phenyl acetic acid, salts of phenyl acetic acid, alpha-nitroso-beta-naphthol, beta-nitroso-alpha-naphthol, methyl benzoic acid, salts of methyl benzoic acid, chlorobenzoic acid, salts of chlorobenzoic acid, methyl salicylic acid, salts of methyl salicylic acid, ethyl salicylic acid, salts of ethyl salicylic acid, vanillin acid, salts of vanillin acid, and mixtures of said chemical reagent; and (e) electrostatically separating the admixture of (d) into a sylvite concentrate poor in carnallite and a carnallite concentrate poor in sylvite.

2. The process of claim 1, wherein electrostatic separation steps (c) and (e) are conducted in a temperature range of approximately 30 to 80° C.

3. The process of claim 1, wherein said sylvite concentrate poor in carnallite of (e) contains 58–61% by weight $K_2O$.

4. The process of claim 1, wherein electrostatic separation steps (c) and (e) are conducted in a temperature range of approximately ambient temperature to 167.5° C.

References Cited by the Examiner

UNITED STATES PATENTS

| 3,052,349 | 9/1962 | Snow | 209—9 |
| 3,073,447 | 1/1963 | Autenrieth | 209—127 |

FOREIGN PATENTS

| 931,702 | 8/1955 | Germany. |
| 1,076,593 | 3/1960 | Germany. |
| 1,092,401 | 11/1960 | Germany. |

HARRY B. THORNTON, *Primary Examiner.*

R. HALPER, *Examiner.*